United States Patent Office 3,493,378
Patented Feb. 3, 1970

3,493,378
TWO-COMPONENT DIAZOTYPE MATERIAL
Oskar Süs, Weisbaden-Biebrich, Germany, assignor, by mesne assignments, to Keuffel & Esser Company, Hoboken, N.J.
No Drawing. Filed Nov. 9, 1967, Ser. No. 681,880
Claims priority, application Germany, Nov. 10, 1966, K 60,673
Int. Cl. G03c 1/58
U.S. Cl. 96—91   7 Claims

ABSTRACT OF THE DISCLOSURE

The invention relates to a two-component diazotype material having a support and a coating thereon containing a light-sensitive diazo compound and a coupling component which is a 4 - hydroxy - naphthalene - alkylenesulphone (2)-ether (1) derivative.

BACKGROUND OF THE INVENTION

It is known to produce diazotype copies in various colours by combining certain diazo compounds with certain coupling components. The influence of the coupling component on the colour of the copy generally is greater than that of the diazo compound. There are thus known yellow coupling components, blue coupling components, red coupling components, etc., generally under the condition that these colour shades are obtained in combination with benzene diazonium compounds having tertiary nitrogen in p-position to the diazo group. Blue shades are thus obtained, for example, with naphthol derivatives, such as derivatives of the 2-hydroxy-3-naphthoic acid, as the coupling components and diazo compounds of the referred type. By combining suitable blue coupling components with certain yellow coupling components, black or almost black shades can be obtained. Not every blue coupling component is suitable for this purpose and not every one, when used alone, yields the deep blue colour shades rich in contrast which are desirable in the diazotype field. Particularly a number of known blue coupling components yielding good blue shades with unsubstituted diazo compounds of the above type do not yield satisfactory blue shades, for example, with the particularly preferable highly light-sensitive diazo compounds having alkoxy groups in the 2- and 5-positions of the benzene ring. Owing to their often high coupling energy in combination with most of the blue coupling components, these diazo compounds also lead to two-component materials having a short storage life.

But generally it is also necessary in the case of blue copies which are not produced with this certain group of diazo compounds to improve certain properties, such as colour shade, storability, and resistance to discoloration upon storage.

SUMMARY OF THE INVENTION

The present invention provides a diazotype material having a support and a light-sensitive coating thereon containing a benzene diazonium compound and a coupling component, characterized in that the coupling component is a compound of the general formula

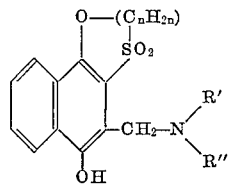

wherein:
R' is an alkyl group with 1 to 4 carbon atoms.
R" is an alkyl group with 1 to 4 carbon atoms, or
R' and R" together with the nitrogen atom to which they are attached are a 5- or 6-membered heterocyclic radical, and
n is 1 or 2, the compound being in the form of the ammonium salt, if desired.

The heterocyclic radicals may be, for example, morpholino, piperidino, pyrrolidino, piperazino groups and the like, which may also carry further substituents, e.g. alkyl groups.

When using these new azo components in combination with diazo compounds derived from p-phenylenediamine derivatives with a secondary or tertiary nitrogen atom in two-components materials, photoprints with deep blue lines are obtained. The sensitized material distinguishes itself by excellent storability so that also diazo compounds with high coupling energy which are not suitable for being used together with other azo components in the layer and normally find use only in the semi-wet process, may be employed for the production of photoprints in the dry developing process.

A particular advantage of the azo components provided by the present invention is their capability of yielding deep blue shades with benzene diazo compounds having tertiary nitrogen in p-position and alkoxy groups in 2-position and 5-position. Since such alkoxy-substituted diazo compounds distinguish themselves by an increased light-sensitivity and find increased use in practice, the new materials represent an important improvement over the prior art also in this respect.

When using this special group of diazo compounds in combination with the new azo components, a material is obtained which has better storability than one containing known blue components. The materials thus are excellently suitable for being used in tropical countries. Also particularly noticeable is the resistance to discoloration upon storage of the images in the developed photoprints and the good water resistance of the image dyes.

The azo components are also well suited for the production of photoprints with black lines on normal and transparent papers. In such a case, compositions are used which, in addition to the blue components, contain yellow components, e.g. partially etherified polyhydrobenzene, aminoalkyl phenols, arylaminophenols or acyl acetic acid aryl amides. The quantity of the yellow component added depends on the purpose of use of the produced photoprints. Whereas in the production of normal copies on usual photoprinting papers, the quantity of the blue component predominates, for the production of intermediate originals on transparent supports layer compositions are preferred in which the yellow component is in excess. Intermediate originals produced therefrom have a good covering power and actinic opacity.

Suitable diazo compounds are the unilaterally diazotized p-phenylene diamines substituted at the nitrogen atom by alkyl, aralkyl or acyl groups, e.g.:

1-diazo-4-diethylamino-benzene,
1-diazo-4-(N-ethyl-N-hydroxyethyl-amino)-benzene,
1-diazo-4-(N-ethyl-N-benzyl-amino)-benzene,
1-diazo-2,5-diethoxy-4-morpholino-benzene,
1-diazo-2,5-di-n-butoxy-4-morpholino-benzene,
1-diazo-2,5-dimethoxy-4-(N-benzyl-N-hydroxyethyl-amino)-benzene,
1-diazo-2,5-diethoxy-4-benzoxyamino-benzene.

The coupling components are used as such or in the form of their salts with inorganic or organic acids. They are different from the water-insoluble starting material, the 4 - hydroxy - naphthalene-alkylene - sulphone(2)-ether(1), by their water-solubility, for which reason they become useful for the application of the light-sensitive coating from aqueous solutions.

In the light-sensitive coatings there are used the usual additives, e.g. antiyellowing agents, small quantities of organic dyestuffs for brightening the background, and the usual stabilizers in the form of organic acids of the aliphatic or aromatic group. In practice, it is of importance to substantially decrease the quantity of stabilizers with respect to the quantities hitherto used for blue copies and thus to accelerate full coupling in the production of copies. This property is advantageous in the use of photoprinting apparatus with a high running speed.

The coupling components used in accordance with the invention are not described in the literature. They are prepared in that, for example, the 4-hydroxy-naphthalene-alkylene-sulphone(2)-ethers(1) prepared according to Example 4 of German patent specification No. 913,177 are dissolved in organic solvents (such as alcohols, dioxan, dimethyl formamide) at normal temperature or with slightly heating and reacted with formaldehyde and the corresponding bases. It is surprising that, despite the substitution in the 1- and 2-positions in the benzene ring of naphthalene, which carries the hydroxyl group, a smooth substitution takes place by the Mannich group in the 3-position.

A detailed preparation procedure is given in connection with Example 1. Further examples for compounds to be used in accordance with the invention are summarized with their data in the table.

By coupling such compounds with a diazo compound, the basically substituted methyl group is eliminated and replaced by the azo group.

In the following examples the part by colume is 1 ccm. if 1 g. is selected as the part by weight.

PREFERRED EMBODIMENTS

Example 1

White photoprinting base paper provided with a precoat of polyvinyl acetate and colloidal silica was coated with a solution of:

3.0 g. of citric acid,
3.0 g. of naphthalene-1,3,6-trisulphonic acid (sodium salt),
5.0 g. of thiourea,
1.0 g. of the compound of Formula 1 (hydrochloride),
2.0 g. of 1-diazo-2,5-diethoxy-4-morpholino-benzene (zinc chloride double salt), and
1.0 ccm. of a 1 percent alizarin irisol blue solution (see "Farbstofftabellen" (Colour Tables) by Schultz, volume 1, page 291, No. 852) in 100 ccm. of water and dried. Copies were produced from the sensitized papers by exposure to light under an original. After development with ammonia gas, copies with brilliant blue lines were obtained.

Instead of the compound of Formula 1, the compounds, of Formula 7, 8, 9, and 10 may also be employed equally successfully.

Preparation of the compound of Formula 1, 4-hydroxy-3 - dimethylaminomethyl-naphthalene-methylenesulphone (2)-ether(1):

9.6 parts by weight of 4-hydroxy-naphthalene-methylenesulphone(2)-ether(1) are dissolved in 200 parts by volume of dioxan and reacted with agitation at room temperature first with 4.8 parts by weight of 40 percent dimethylamine solution and then with 4.2 parts by weight of 30 percent formaldehyde solution. After stirring for another half hour, the reaction solution is rendered congo-acid with 10 parts by volume of concentrated nitric acid, the 4-hydroxy-3-dimethylaminoethyl-naphthalene-methylenesulphone(2)-ether(1) precipitating as hydrochloride in the form of white crystals. It is sucked off and, for the purpose of purification, dissolved in water, filtered and again precipitated with 10 percent sodium chloride.

The melting point of the hydrochloride is 179 to 180° C.

The free base is obtained from the hydrochloride by dissolving the latter in water and neutralizing the solution with 10 percent soda solution. The precipitated crude product of the base is recrystallized from ethylene glycol monomethyl ether/water. Melting point: 145 to 148° C.

The compounds of Formula 7, 8, 9, and 10 are prepared analogously.

Example 2

As in the preceding example, white photoprinting base paper was coated with a solution of 3.0 g. of citric acid,
3.0 g. of naphthalene-1,3,6-trisulphonic acid (sodium salt),
5.0 g. of thiourea,
1.0 g. of the compound of Formula 2 (hydrochloride),
2.0 g. of 1-diazo-2,5-dimethoxy-4-morpholino-benzene (fluoborate), and
1.0 ccm. of a 1 percent aqueous alizarin irisol blue solution (see Example 1) in 100 ccm. of water and, as indicated therein, processed to give photoprints. Copies with violet-blue lines on a bright background were obtained.

The compound of Formula 2 is prepared according to the procedure given in Example 1 for the compound of Formula 1.

| Formula No. | Meaning of the symbols (Formula A) | Designation | Melting point, ° C. Free base | Melting point, ° C. Hydrochloride |
|---|---|---|---|---|
| 1 | n=1, R'=CH₃, R''=CH₃ | 4-hydroxy-naphthalene-3-dimethyl-aminomethyl-methyl-enesulphone(2)-ether(1). | 145–148 | 179–180, with decomposition. |
| 2 | n=1, R'/R''}–N⟨H, O⟩ | 4-hydroxy-naphthalene-3-morpholino-methyl-methylene-sulphone(2)-ether(1). | 192 | 223, with decomposition. |
| 3 | n=1, R'=C₂H₅, R''=C₂H₅ | 4-hydroxy-naphthalene-3-diethylamino-methyl-methyl-enesulphone(2)-ether(1). | 169–170 | 226–228, with decomposition |
| 4 | n=1, R'=n-C₄H₉, R''=n-C₄H₉ | 4-hydroxy-naphthalene-3-di-n-butylamino-methyl-methyl-enesulphone(2)-ether(1). | 104–105 | Chars from 225. |
| 5 | n=1, R'=n-C₃H₇, R''=n-C₃H₇ | 4-hydroxy-naphthalene-3-di-n-propylamino-methyl-methyl-enesulphone(2)-ether(1). | 132 | Chars from 225. |
| 6 | n=1, R'/R''}–N⟨H⟩ | 4-hydroxy-naphthalene-3-piperidino-methyl-methylenesulphone(2)-ether(1). | 154–155 | 210, with decomposition. |
| 7 | n=1, R'=i-C₃H₇, R''=i-C₃H₇ | 4-hydroxy-naphthalene-3-di-(iso-propyl)amino-methyl-methylenesulphone(2)-ether (1). | | Sinters from 160. |

| Formula No. | Meaning of the symbols (Formula A) | Designation | Melting point, ° C. Free base | Melting point, ° C. Hydrochloride |
|---|---|---|---|---|
| 8 | n=1<br>R'=tert.-$C_4H_9$<br>R''=tert.-$C_4H_9$ | 4-hydroxy-naphthalene-3-di-(tert.butyl)amino-methyl-methylenesulphone(2)-ether (1). | Sinters from 120 fuses at 170–171. | Chars from 220. |
| 9 | n=1<br>R'}—N H N—$CH_3$<br>R''} | 4-hydroxy-naphthalene-3-(4'-methyl-piperazino)methyl-methylenesulphone(2)-ether (1). | 181–182 | Chars from 225. |
| 10 | n=1<br>R'}—N H<br>R''} | 4-hydroxy-naphthalene-3-pyrolidinomethyl-methylenesulphone(2)-ether(1). | 154–155 | 208–210. |
| 11 | n=2<br>R'}—N H<br>R''} | 4-hydroxy-naphthalene-3-pyrolidinomethyl-ethylene sulphone(2)-ether(1). | 173–175 | Changes colour from 160 fuses at 234 with decomposition. |

Example 3

White photoprinting base paper was sensitized analogously to preceding Example 1.

Instead of the compound of Formula 1, the compound of Formula 3 (hydrochloride) was used and, instead of the diazo compound indicated therein, 1-diazo-4-(N-ethyl-N-$\beta$-hydroxyethyl-amino) benzene (zinc chloride double salt) was used. The copies had opaque bluish-violet lines on a white background.

The compound of Formula 3 is prepared according to the procedure given in Example 1 for the compound of Formula 1.

Example 4

Transparent paper from natural crude material was lacquered with acetyl cellulose (about 50 to 55 percent $CH_3COOH$) and then coated with a solution of:

3.0 g. of citric acid,
1.0 g. of boric acid,
3.0 g. of thiourea,
1.6 g. of the compound of Formula 4 (hydrochloride), and
3.6 g. of 1-diazo-2,5-di-n-butoxy-4-morpholino-benzene (zinc chloride double salt)
in 100 ccm. of a mixture of water and isopropyl alcohol at a ratio of 6:4.

After exposure to light and development, copies with brilliant violet-blue lines were obtained.

When 0.5 g. of 1-hydroxy-2,5-dimethyl-4-dimethyl-aminomethyl-benzene is added to the above solution, copies with black lines are obtained which are suited as intermediate originals for making further copies.

The preparation of the compound of Formula 4 is shown in Example 1.

Example 5

A commercial cellulose acetate film (about 50 to 55 percent $CH_3COOH$) was coated with a solution of
3.0 g. of citric acid,
1.0 g. of boric acid,
3.0 g. of thiourea,
1.5 g. of the compound of Formula 5, and
3.6 g. of 1-diazo-2,5-dimethoxy-4-morpholino-benzene (fluoborate) in 100 ccm. of a mixture of water and isopropyl alcohol at a ratio of 3:7 and, as usual, photoprints were made from this material. Copies with brilliant blue lines on a colorless background were obtained.

The preparation of the compound of Formula 5 is carried out analogously to the procedure given in Example 1.

Example 6

According to the working procedure given in Example 1, copies were made on white photoprinting base paper. Instead of the compound of Formula 1 indicated therein, the compound of Formula 6 (hydrochloride) was used and, instead of the diazo compound indicate therein, 1-diazo-2-ethoxy-4-diethylamino-benzene (zinc chloride double salt) was used. Copies with neutral blue lines on a pure white background were obtained.

The preparation of the compound of Formula 6 is shown in Example 1.

Example 7

Photoprints were made as described in Example 1. Instead of the diazo compound indicated therein, 1-diazo-2,5-dimethoxy-4-(N-benzoyl-N-$\beta$-hydroxyethyl)amino-benzene (zinc chloride double salt) was used. Copies with brilliant blue lines were obtained.

When using 1-diazo-2,5-diethoxy-4-benzoylamino-benzene (zinc chloride double salt) as the light-sensitive substance, photoprints with intensive violet-blue lines are obtained.

Example 8

As in Example 1, a white photoprinting base paper provided with a precoat of polyvinyl acetate and colloidal silica was coated with a solution of:
3.0 g. of citric acid,
3.0 g. of naphthalene-1,3,6-trisulphonic acid (sodium salt),
5.0 g. of thiourea,
1.0 g. of the compound of Formula 11, and
2.0 g. of 1-diazo-2,5-diethoxy-4-morpholino-benzene (zinc chloride double salt) in 100 ccm. of water and dried. After exposure to light and development with ammonia gas, copies with violet-blue lines were obtained.

The compound of Formula 11 is prepared according to the procedure given in Example 1 for the compound of Formula 1.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Diazotype material comprising a support having a composition thereon, said composition comprising:
   (a) a light-sensitizer diazonium compound; and
   (b) an azo dye coupler having the general formula:

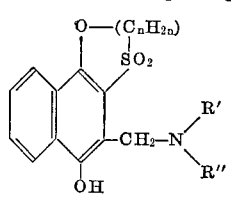

wherein
- R' and R" are individually alkyls of 1 to 4 carbon atoms; or
- R' and R", together with the nitrogen atom to which they are attached, form a 5- or 6-membered heterocyclic radical; and
- n is 1 or 2

2. Material according to claim 1 wherein said diazonium compound is a 1-diazo-2,5-alkoxy-4-aminobenzene.

3. Material according to claim 1 wherein said coupler is a 4-hydroxy-naphthalene-3-dialkylaminomethyl-methylenesulphone(2)-ether(1).

4. Material according to claim 1 wherein said coupler is a 4-hydroxy-naphthalene-3-pyrrolidinomethyl-alkylenesulphone(2)-ether(1).

5. Material according to claim 1 wherein said coupler is 4-hydroxy-naphthalene-3-(4'-methyl-piperazino) methyl-methylenesulphone(2)-ether(1).

6. Material according to claim 1 wherein said coupler is 4-hydroxy-naphthalene-3-morpholinomethyl-methylenesulphone(2)-ether(1).

7. Material according to claim 1 wherein said coupler is 4-hydroxy-naphthalene-3-piperidinomethyl-methylenesulphone(2)-ether(1).

References Cited

UNITED STATES PATENTS

| | | | |
|---|---|---|---|
| 1,857,920 | 5/1932 | Lantz | 96—91 |
| 3,343,960 | 9/1967 | Sus | 96—91 |
| 3,406,071 | 10/1968 | Sus et al. | 96—91 |

NORMAN G. TORCHIN, Primary Examiner

C. BOWERS, Assistant Examiner

U.S. Cl. X.R.

96—49; 260—327, 332.1, 332.3, 345.2, 346.2, 347.2